Jan. 14, 1930.                    C. A. JANSON                    1,743,893
                    MACHINE FOR FACET FILING OF SAW TEETH
                         Filed Dec. 1, 1925         3 Sheets-Sheet 1

INVENTOR
CARL A. JANSON
BY
ATTORNEYS

Jan. 14, 1930.   C. A. JANSON   1,743,893
MACHINE FOR FACET FILING OF SAW TEETH
Filed Dec. 1, 1925   3 Sheets-Sheet 2

INVENTOR
CARL A. JANSON
BY Munn &Co
ATTORNEYS

Jan. 14, 1930.  C. A. JANSON  1,743,893
MACHINE FOR FACET FILING OF SAW TEETH
Filed Dec. 1, 1925    3 Sheets-Sheet 3
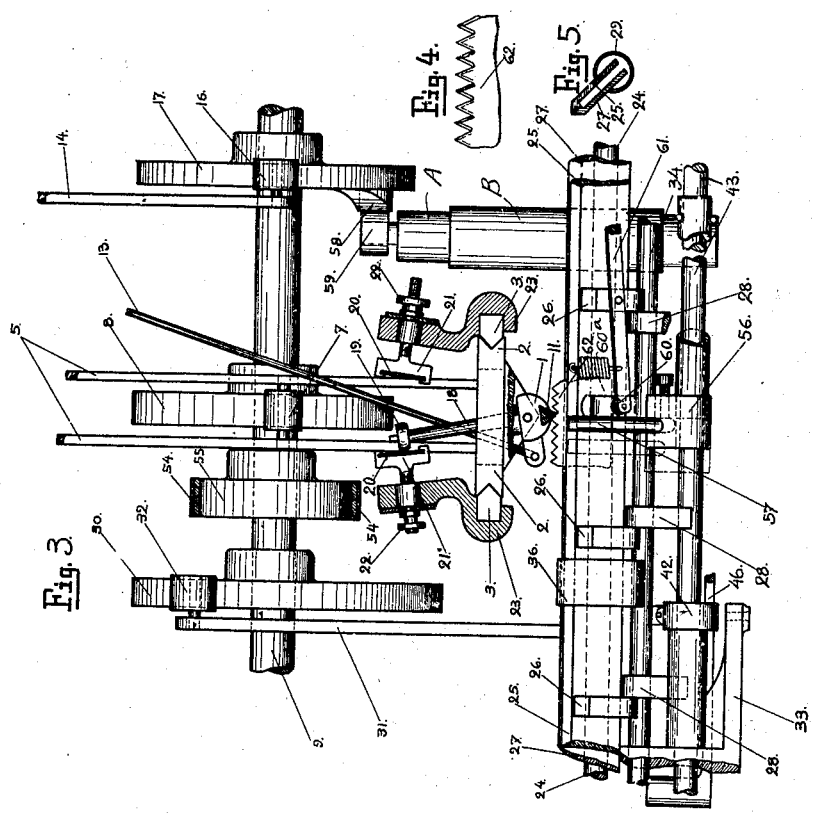
INVENTOR
CARL A. JANSON
BY
ATTORNEYS Patented Jan. 14, 1930

1,743,893

UNITED STATES PATENT OFFICE

CARL AUGUST JANSON, OF SANDVIKEN, SWEDEN, ASSIGNOR TO SANDVIKENS JERN-VERKS AKTIEBOLAG, OF SANDVIKEN, SWEDEN, A COMPANY OF SWEDEN

MACHINE FOR FACET FILING OF SAW TEETH

Application filed December 1, 1925, Serial No. 72,516, and in Sweden October 24, 1925.

This invention relates to a machine for facet filing of saw teeth, which machine is so arranged, that by means of one (or several) filing strokes it facet files one edge of a saw tooth without touching the adjacent tooth. In the shown embodiment of the machine the file for the improving of the saw teeth is so arranged in the machine, that it first facet files one edge of a saw tooth and immediately afterwards the other edge of the same tooth, without the saw being thereby moved out of its position. As a result thereof it is possible to make very uniform and exactly facet filed saw teeth by the machine.

Figure 1:
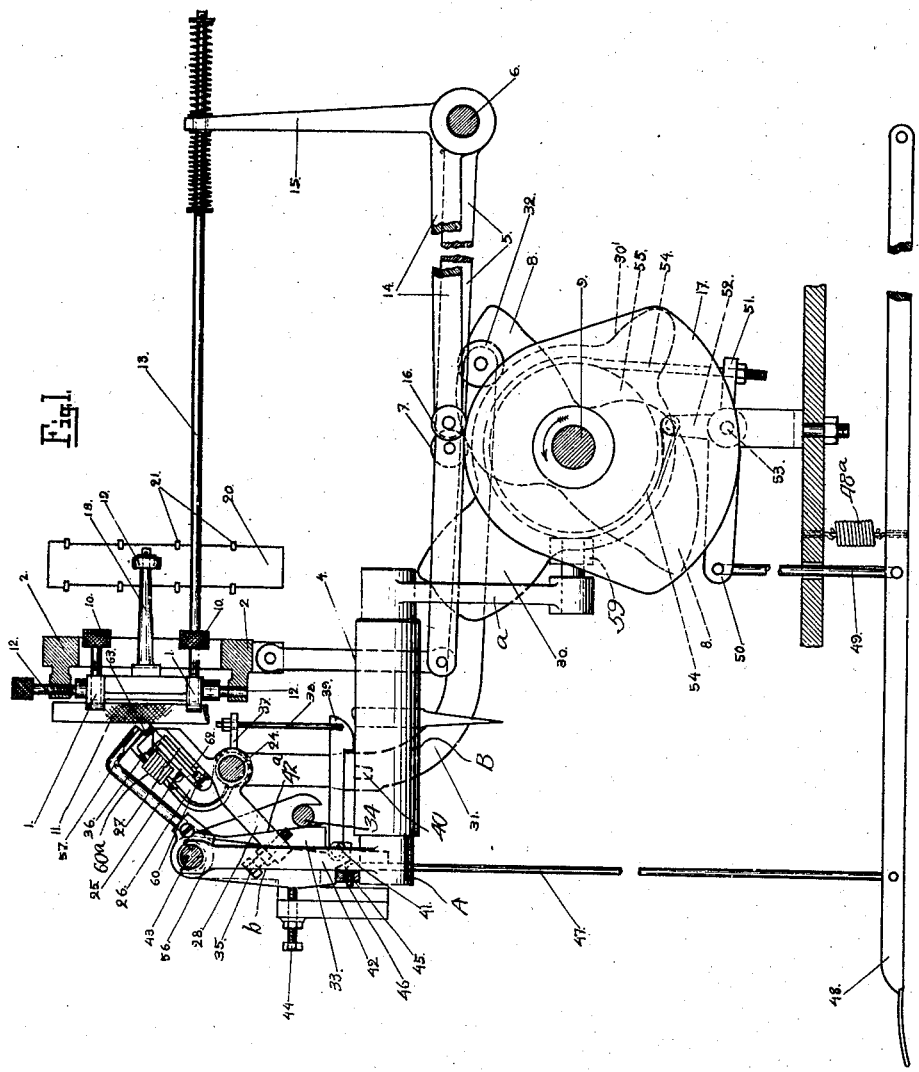
Figure 2:
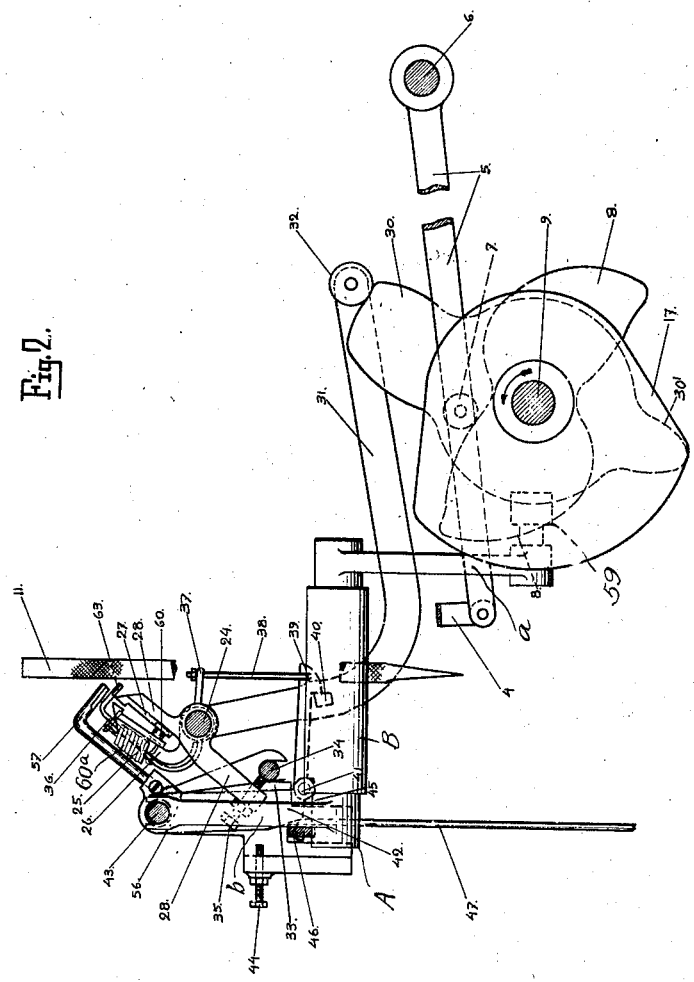

An embodiment of a saw filing machine according to this invention is shown in the accompanying drawings. Fig. 1 is a side view of the machine, and Fig. 2 is also a side view with the parts of the machine in another position. Fig. 3 is a plan view of the machine. Fig. 4 shows a part of the saw with a group of facet-filed teeth. Fig. 5 is a detail of the saw holder.

The file holder 1 is detachably supported by a frame 2, movable up and down in vertical guides 3, Fig. 3, by means of a link 4, Fig. 1, the upper end of which is connected with the frame 2, while the lower end is jointed to a lever 5, Figs. 1–3 made in two parts and rotatable on a stationary shaft 6. The lever 5 is provided with a roller 7 co-operating with a double curved cam-disc 8 fastened on a horizontal main shaft 9 journalled in the frame of the machine and driven by a suitable source of power. The file holder 1 is provided with two screws 10, Fig. 1, touching the base of the vertical triangular file 11 so, that the working part of the file always occupies the same position in relation to the file-holder. The latter is swingable at its two ends about pivots or the like 12, Fig. 1, the axis of which is parallel with the longitudinal direction of the file and of which pivots one is adjustable in a vertical direction. The swinging movement of the file-holder 1 is produced by a link bar 13 jointed to the file holder, Figs. 1 and 3, which link bar by means of a screw spring is yieldingly connected to the one arm 15 of a bell crank 14, 15 turnable on the stationary shaft 6.

The other arm 14 of said bell crank is provided with a roller 16, Figs. 1 and 3, which co-operates with a cam-disc 17, fastened to the main shaft 9. On that side of the file-holder 1 which is opposite to the file 11 an almost horizontal stop-arm 18 is fastened, which at its free end is provided with a roller 19. The swinging movement of the file holder, which movement may be altered with regard to the different sizes of saw teeth, is limited by two thin plates 20, Figs. 1 and 3, adjustable by hand toward and away from each other and situated approximately parallel with the file, said plates 20 acting as stops for the roller 19, and being supported by a number of holders 21 adjustable by means of nuts 22, Fig. 3. These nuts are arranged in arms 23, fastened to the frame of the machine.

The file holder 1 is replaceable, so that by placing a file-holder with another distance between the working file part and the swinging axis of the holder, the desired angle of inclination of the saw teeth may be effected.

The saw-holder consists partly of an upper jaw 25 supported by a number of arms 26 firmly connected to a shaft 24 journalled in the frame of the machine, and partly of a lower jaw 27 which is also supported by a number of arms 28 pivoted to the shaft 24. The jaws 25, 27 are acted upon by leaf springs 29, Fig. 5, which tend to hold them closed. A cam-disc 30, $30^1$ fastened on the main shaft 9, acts upon the upper jaw 25 by means of a lever 31, one end of which is firmly connected to the shaft 24 common to the jaws 25, 27, while the other end is provided with a roller 32, co-operating with the cam-disc 30, $30^1$ just mentioned. In the frame of the machine are lugs 33 or the like, wherein a stop-bar 34 is fixed. This stop-bar is approximately parallel with the jaws. The arms 28 are provided with adjustable stop screws 35, Figs. 1 and 2, adapted to co-operate with the stop-bar 34 for limiting the upward movement of the lower jaw 27.

In order to allow the insertion of the saw between the jaws 25, 27, a hook 36 which is swingable about the shaft 24, is swung upwards and backwards. The hook 36 is on the other side of the shaft 24 provided with an arm 37 joined to an approximately vertical bar 38 for the raising of a hook 39, Figs. 1 and 2, which is adapted to co-operate with a lateral projection 40 on the lever 31 and which is movable about a pivot 41 fastened in a locking arm 42, which in turn is pivoted to a horizontal shaft 43, fastened in the frame. The swinging movement backwards of the arm 42 is limited by an adjustable screw 44, and the arm 42 is provided with a notch 45 adapted to co-operate with a part 46, which by means of a vertical bar 47 is connected with a treadle 48, Fig. 1, which in turn is connected to a friction- or tooth clutch, known by itself but not shown in the drawings, which clutch connects or disconnects the driving power.

The treadle 48 is joined to a vertical bar 49, Fig. 1, which in turn is pivoted to a lever 50 swingable in a vertical plane and provided with two arms 51, 52, Fig. 1, projecting approximately at right angles to each other. The lever 50 is mounted on a pivot 53 secured to the frame of the machine. The arms 51, 52 of the lever are joined to both ends of a brake band 54 acting upon a brake-disc 55, Figs. 1 and 3, fixed on the main shaft 9.

On the shaft 43 a sleeve 56 is fastened, which is adjustably connected to a feeding finger 57, Figs. 1–3, co-operating with the teeth of the saw, the shape of which feeding finger corresponds to the tooth spaces on the saw. The finger 57 is replaceable. When filing saws having another size of the tooth spaces, one is, therefore, able to insert a corresponding feeding finger. The sleeve 56 is moved forward and backward axially by means of a cam 58, Fig. 3, situated on one side of the disc 17. This cam 58 co-operates with a roller 59 on the arm $a$ of a rock shaft A mounted in the bearing B and having at its other end the arm $b$ connected with the sleeve 56, so that this sleeve is caused to move in the manner just described. In one of the jaws 25, 27 of the saw-holder, a roller 60, Figs. 1–3, is journalled, which roller is supported by an arm 61, Fig. 3, and is acted upon by a spring $60^a$ which tends to force the roller 60 against the back edge of the saw 62, so that the saw will be held pressed against the feeding finger 57.

When the saw is to be inserted between the jaws 25, 27 of the saw-holder, these occupy the position shown in Fig. 2. When the saw is inserted length-wise between the jaws 25, 27, it abuts against a slanting part 63 at the free end of the hook 36, so that the hook is swung upwards. Thereby the hook 39 is swung by means of the bar 38 out of engagement with the projection 40 on the lever 31, whereby the locking arm 42 is freed, so that under the action of a spring $42^a$ it is swung against the stop screw 44 and remains in that position, Fig. 1, when the part 46 is brought downward by actuating the treadle 48. When the treadle 48 is acted upon, the brake-band 54 is loosened, so that the machine can be set in motion. At the beginning of the movement of the main shaft 9, which takes place in the direction of the arrow, Figs. 1 and 2, the lever 31 is swung down against the lowest part of the cam 30, $30^1$, which has for consequence that the upper jaw 25 is swung against the lower jaw 27, until the saw becomes clamped between the jaws, whereafter both jaws are swung together to the position shown in Figs. 1 and 3. The roller 32 on the lever 31 is now on the lowest part of the cam 30, $30^1$, and the file 1 begins its upward movement. In Fig. 1 is shown the roller 7 journalled in the lever 5, a bit on its way to the highest point of the cam 8. During its upward movement the file facet-files one edge of a saw tooth, as shown in Fig. 3, without at the same time touching the adjacent tooth. When the file has reached its uppermost position, the roller 32 journalled in the lever 31, is at the beginning of the cam 30. When the roller 32 passes this cam, both jaws 25, 27 are lifted for a little bit by the lever 31, whereby the file 11 is free to swing so that immediately afterwards it can facet file the opposite edge of the same saw tooth. This swinging movement of the file is caused by the bar 13, the lever 14, 15, the roller 16 and the cam-disc 17. During its downward movement the file is swung, owing to the movement of the roller 16 against the highest point of the cam-disc 17. During the filing, the feeding finger 57, owing to the fact that the roller 59 passes the lowest part of the cam-disc 58, has been moved from the position, shown in Fig. 3 by full lines, to the position indicated by dash dot lines in the same figure. During this movement the feeding finger is out of engagement with the saw 62. Further, the two jaws 25, 27 are again swung upwards during the downward movement of the file, so that the finger 57 engages the space between two saw teeth, whereupon the jaws 25, 27 are separated, Fig. 2, leaving the saw free between them. When the roller 59 thereafter passes the highest point of the cam 58, the finger 57 is moved to the position, shown by full lines in Fig. 3, whereby the saw by means of the finger is fed forward one tooth. When the file has facet filed all saw teeth in the manner described above, the saw has been moved so far, that the hook 36 falls back into that position it occupied, before the saw was inserted between the jaws 25, 27, whereby the hook 39 engages the projection 40 on the lever 31, and the locking arm 42 is released from the part 46, as shown in Fig. 2.

When the locking arm 42 is swung to the position shown in Fig. 2, the bar 47 and thereby also the treadle 48 is moved upwards by means of a spring $48^a$, whereby the source of power is disconnected, the brake band is pulled and the machine is brought to a standstill. As is clear from the foregoing, the saw is now free between the jaws 25, 27 and may easily be replaced.

The embodiment shown and described may evidently be altered in many respects without departing from the essential characteristic of the invention, that is to say, the possibility of being able to facet file a tooth edge by means of one (or several) filing strokes without thereby touching the adjacent tooth.

Having now described my invention, what I claim as new and desire to secure by Letters Patent is:

1. In a machine for filing saw teeth, a reciprocating member, a swinging file holder mounted therein, a movable saw holder, means for moving the saw holder to disengage the saw from the file to permit the file holder to swing into position to file the edges of the saw tooth and means for holding the saw holder immovable longitudinally while both edges of a tooth are filed.

2. In a machine for filing saw teeth, a movable saw holder, a reciprocating member, a swinging file holder mounted in the member, means for reciprocating said member, means for moving the saw holder to disengage the same from the file, means for swinging the file holder to bring the file into position for the filing of both edges of the saw tooth one after the other, and means for holding the saw holder immovable longitudinally while both edges are filed.

3. In a machine for filing saw teeth, a movable saw holder, a reciprocating member, a file holder pivotally mounted in the member, means for reciprocating said member, means for moving the saw holder to disengage the saw from the file, means for swinging the file holder to bring the file holder in position for the filing of both edges of the same tooth, and means for holding the saw holder immovable longitudinally while both edges of a tooth are filed, and adjustable means for limiting the swinging movement of the file holder.

4. In a machine for filing saw teeth, a reciprocating member, a file holder mounted in the member to reciprocate therewith and to swing therein, a saw holder having intermittent oscillatory movement, means for swinging the file holder while the saw holder is stationary, a swinging saw feeding member, means for moving the saw holder towards and from the file holder, and means for moving the feeding member into and out of engagement with the saw teeth.

5. In a machine for filing saw teeth, a reciprocating member, a swinging file holder mounted therein, a pivoted saw holder, means for swinging the saw holder towards and from the file holder, a pivoted saw feeding finger having an angular end extending over the saw holder, and means for swinging the feeding finger into and out of engagement with the saw teeth.

6. In a machine for filing saw teeth, a reciprocating member, a swinging file holder mounted therein, a horizontal shaft, a movable member carrying the shaft, and having a lug, a saw holder comprising jaws, one of which is fixed to the shaft and the other one pivoted on the said shaft, a hook pivoted on said shaft, said hook extending over the jaws and provided with an arm, a pivoted locking arm, a hook pivoted to the locking arm and adapted to engage the lug of said member, a connection between the hook and the arm of the first hook, and a movable member cooperating with the locking arm to prevent swinging movement of said arm.

7. In a saw filing machine, a driven shaft, a power controlling pedal, saw clamping jaws, means for operating the jaws, a locking device associated with the jaw operating means and controlled by the pedal, and a brake device for the driven shaft and operated by the said pedal.

8. In a machine for filing saw teeth, a saw holder having oscillatory movement, means for holding the saw holder from oscillating a reciprocating and swinging file holder, and means for swinging the file holder while the saw holder is stationary whereby one edge of a tooth will be faceted upon the reciprocating movement of the file in one direction and the other edge when the file moves in the opposite direction while the saw is held stationary against oscillating movement.

9. In a machine for filing saw teeth, a saw holder having intermittent longitudinal and oscillatory movement, means for holding the holder from oscillating, a reciprocating and swinging file holder, the saw holder and file holder being relatively movable one to the other to bring the file between two adjacent teeth, and means for swinging the file holder while the saw holder is stationary, to cause it to file first one edge of a tooth and then the other edge.

10. In a machine for filing saw teeth, a saw holder having intermittent longitudinal and oscillatory movements, means for holding the saw holder against longitudinal movement, a reciprocating file holder, means for holding the saw from oscillating, and means whereby the file may be operated to file both edges of a tooth while the saw is held stationary against longitudinal movement.

11. In a machine for filing saw teeth, a saw holder having intermittent longitudinal and oscillatory movements, means for holding the saw holder against longitudinal movement, a reciprocating file holder, means for holding the saw holder from oscillating, and means whereby, while the saw is stationary against longitudinal movement, the file may be operated to file one edge of a tooth in its movement in one direction and the other edge in its opposite direction.

12. In a machine for filing saw teeth, a saw holder having oscillatory movement, means for holding the holder from oscillating, a reciprocating and swinging file holder, and means for swinging the file holder while the saw holder is stationary to cause the file to facet both edges of a tooth while the saw is held stationary against oscillating movement.

In witness whereof, I have hereunto signed my name.

CARL AUGUST JANSON.